(12) United States Patent
Asbeck

(10) Patent No.: US 6,233,810 B1
(45) Date of Patent: May 22, 2001

(54) APPARATUS FOR MACHINING WORKPIECES

(75) Inventor: Jochen Asbeck, Bergheim (DE)

(73) Assignee: Hegenscheidt-MFD GmbH & Co. KG, Erkelenz (DE)

(*) Notice: Subject to any disclaimer, the term of this patent is extended or adjusted under 35 U.S.C. 154(b) by 0 days.

(21) Appl. No.: 09/335,822

(22) Filed: Jun. 18, 1999

(30) Foreign Application Priority Data

Jun. 25, 1998 (DE) .............................................. 198 28 239

(51) Int. Cl.⁷ ................................ B23B 5/18; B32C 3/06
(52) U.S. Cl. ............................... 29/563; 29/33 P; 29/564; 29/6.01; 82/106; 82/129; 409/199; 409/200
(58) Field of Search ..................... 409/158, 165, 409/199, 198, 202, 212; 82/129, 107, 106; 414/751; 29/6.01, 564, 33 P, 563; 483/14, 15; 451/249; 334, 385

(56) References Cited

U.S. PATENT DOCUMENTS

| | | | |
|---|---|---|---|
| 3,543,392 | * 12/1970 | Perry et al. ............................. | 29/564 |
| 3,934,700 | * 1/1976 | Schubert et al. ................... | 198/345.3 |
| 4,034,465 | * 7/1977 | Shelton ................................... | 29/563 |
| 4,274,801 | * 6/1981 | Herb et al. ............................. | 414/751 |
| 4,305,232 | * 12/1981 | Price ....................................... | 451/249 |
| 4,559,681 | * 12/1985 | Coquillart et al. .................... | 409/199 |
| 4,631,813 | * 12/1986 | Daniels et al. ......................... | 29/33 P |
| 4,637,761 | * 1/1987 | Murray et al. ......................... | 409/199 |
| 4,738,387 | * 4/1988 | Jaufmann et al. ..................... | 29/563 |
| 4,761,918 | 8/1988 | Hirota . | |
| 4,807,677 | * 2/1989 | Rottmann ............................... | 29/564 |
| 4,984,351 | * 1/1991 | Matsuyama et al. ................. | 409/158 |
| 4,999,895 | * 3/1991 | Hirose et al. .......................... | 29/33 P |
| 5,062,195 | * 11/1991 | Binder .................................... | 29/564 |
| 5,078,570 | * 1/1992 | Loock .................................... | 414/751 |
| 5,205,026 | * 4/1993 | Sticht .................................... | 29/33 P |
| 5,241,732 | * 9/1993 | Tseng ..................................... | 29/33 P |
| 5,407,415 | * 4/1995 | Spishak ................................... | 29/563 |
| 5,443,412 | * 8/1995 | Yoshikawa et al. ................... | 29/564 |
| 5,979,039 | * 11/1999 | Rehm ..................................... | 29/563 |
| 5,984,599 | * 11/1999 | Janssen ................................. | 409/199 |
| 5,997,452 | * 12/1999 | Assie ..................................... | 483/15 |

FOREIGN PATENT DOCUMENTS

| | | | |
|---|---|---|---|
| 89803/91 | * 6/1992 | (AU) ....................................... | 29/564 |
| 2658970 | * 11/1978 | (DE) ...................................... | 409/199 |
| 3722180 | * 1/1989 | (DE) ...................................... | 409/199 |
| 38 34 208 A1 | 4/1989 | (DE) . | |
| 196 26 627 C1 | 9/1997 | (DE) . | |
| 0 417 446 A1 | * 7/1990 | (EP) . | |
| 2233267 | * 9/1991 | (GB) ...................................... | 409/199 |
| WO 96/17705 | 6/1996 | (WO) . | |

* cited by examiner

*Primary Examiner*—A. L. Wellington
*Assistant Examiner*—Erica Ergenbright
(74) *Attorney, Agent, or Firm*—Proskauer Rose LLP

(57) ABSTRACT

The present invention relates to an apparatus for machining workpieces (W1 to W4) by stock removal, in particular the main (a1 to a5) and/or connecting rod bearing journals (b1 to b4) of crankshafts. For this purpose the apparatus is equipped with at least two guideways (7, 8) which are distanced from one another and are arranged parallel with respect to one another and on which at least one workpiece fixture (9, 10) holding a workpiece (W1 to W4) each can be moved from a transfer position (P1, P2) to a working position (A1 to A6), and with two discoid cutters (17, 18, 21) of which each can be moved on a cutter guideway (13, 14, 19), which is arranged between the guideways (7, 8), from a first working position (A1, A2, A5) in which it works on the workpiece (W1, W3) held by the first workpiece fixture (9) to a second working position (A3, A4) in which it works on the workpiece (W2, W4) held by the second workpiece fixture (10). The apparatus in accordance with the invention allows performing the machining with high precision of the workpieces.

9 Claims, 4 Drawing Sheets

APPARATUS FOR MACHINING WORKPIECES

BACKGROUND OF THE INVENTION

The invention relates to an apparatus for machining workpieces by stock removal, in particular the main and/or connecting rod bearing journals of crankshafts. Such apparatuses are known, for example, from the publication of the PCT application WO 96/17705 or the German patent specification DE 196 26 627 C1.

In the apparatus as known from DE 196 26 627 C1 the workpiece is held during the machining in a workpiece fixture which is equipped with at least one turntable drive. The turntable drive is used to rotate the workpiece, which is otherwise stationary, about its longitudinal axis. At least two milling cutters are provided in the known apparatus to machine the workpiece, which cutters machine the workpiece simultaneously. All advance motions which are required for example as a result of the eccentricity of the surface areas to be machined during the machining of the connecting rod bearing journals of crankshafts are performed by separate actuating drives of the milling cutters.

The advantage of the apparatus known from DE 196 26 627 C1 is that short machining cycles are achieved with highly specialized tool units in the apparatus per se. In this process, the machining operations are performed simultaneously by several milling cutters. The disadvantage is, however, that when two main and connecting rod bearing journals are machined simultaneously by means of two discoid milling cutters the cutters must be arranged with a left-hand and right-hand design. The simultaneous machining of two main or connecting rod bearing journals of a crankshaft additionally has an unfavourable effect on the precision of the machining.

An apparatus is known from WO 96/17705 in which the machining of the workpiece is also performed simultaneously by two discoid cutters. In contrast to the aforementioned known apparatus, the apparatus as described in WO 96/17705 comprises two workpiece fixtures and a conveying device for conveying the workpiece. The workpiece fixtures are flush with respect to one another and with respect to the conveying devices arranged in front of and behind the apparatus, so that the conveying device can convey the workpiece in a linear movement from the first conveying apparatus to the first workpiece fixture and from there to the second workpiece fixture and further to the second conveying apparatus. The discoid cutters are linearly movable between the two workpiece fixtures, so that they can first perform machinings on the workpiece gripped in the first workpiece fixture in a first working position and thereafter machinings on the workpiece gripped in the second workpiece fixture in a second working position.

For machining purposes the workpiece which in the known apparatus reaches the apparatus by way of the first conveying apparatus is loaded by the conveying device at first into the first workpiece fixture. Thereafter the workpiece is machined, with the discoid cutters assuming their first working position. After the end of the first machining operations the workpiece is removed by the conveying device from the first workpiece fixture and brought to the second workpiece fixture. Then further machining is performed by the discoid cutters on the workpiece gripped in the second workpiece fixture. During the machining steps the workpiece is turned by the turntable drive of the workpiece fixture. The advance and longitudinal motions are performed by the discoid cutters during the machining. Once the workpiece is gripped in the second workpiece fixture the conveying device can bring a new workpiece to the first workpiece fixture, so that the discoid cutters can commence with the machining of the new workpiece immediately after ending the machining of the workpiece gripped in the second workpiece fixture.

In the apparatus as known from WO 96/17705 the flow of material is improved in such a way that such an apparatus can be included in an automated production sequence. For this purpose, however, it is necessary to rechuck the workpiece at least once during the machining. This not only leads to the problem of the additional machining time required for the rechucking and conveying process, but also to a considerable increase in the complexity of the apparatuses required for controlling and monitoring the machining as well as for automated transport of the workpieces within the apparatus per se.

The disadvantage in this case too is that when two main or connecting rod bearing journals of a crankshaft are simultaneously machined by means of two discoid cutters it is necessary to provide them with a left-hand and right-hand design.

The simultaneous machining of two main and connecting rod bearing journals of a crankshaft and the rechucking of the crankshaft also have an unfavourable influence on the precision of the machining.

It is the object of the present invention, based on the aforementioned state of the art, to provide an apparatus of the kind mentioned above which allows a high machining precision.

SUMMARY OF THE INVENTION

This object is achieved by an apparatus for the machining of workpieces by stock removal which is equipped with at least two guideways which are arranged at a distance from one another and parallel to each other and on which at least one workpiece fixture each holding a workpiece can be moved from a transfer position to a working position, and with two discoid cutters, of which each cutter is movable on a cutter guideway, which is arranged between the guideways, from a first working position at which it works on the workpiece held by the first workpiece fixture to a second working position at which it works on the workpiece held by the second workpiece fixture.

In contrast to the known state of the art, two workpiece fixtures which are each movable on a separate guideway are provided in the apparatus in accordance with the invention. The workpiece fixtures per se can travel in this way from the actual machining position to a transfer position in which they receive the workpiece. Simultaneously, each discoid cutter can be moved back and forth between the workpiece fixtures, so that it can work successively alternatingly on the workpieces gripped between the two workpiece fixtures. The actuating movements in the longitudinal direction that may be required during the machining of the workpiece are performed by the respective workpiece fixture, so that a respective mobility of the cutter can be omitted. If the workpiece is turned about its longitudinal axis during the machining, any feed motion of the tool in the radial direction that may be required as a result of the eccentricity of the workpiece can be performed by the cutter per se. The complexity of the apparatuses required for performing and controlling the workpiece machining is thus reduced to a minimum.

The parallel arrangement of the guideways additionally allows that during the machining of the one workpiece the respective other workpiece fixture can receive a new workpiece and move it to the machining position. After the end of the machining of the first workpiece the workpiece to be newly machined is ready, so that the discoid cutter merely has to be moved to the working position of said new workpiece. The unloading of the previously finished workpiece, the loading of the respective workpiece fixture with a new workpiece and the conveyance of the workpiece fixture with the new workpiece to its working position take place in the meantime.

As a result of the parallel processed sequence of a plurality of conveying, transferring and machining steps as are enabled by the apparatus in accordance with the invention, the dwell times of a workpiece between its transfer in the introduced state and its return in the finished state are short, although, as a rule, only one discoid cutter is in engagement with the respective workpiece at a time.

In the embodiment of the invention there are several discoid cutters which work successively on the same workpiece. As a result of the parallel arrangement of the cutter guideways and the simultaneous movability of the workpiece fixtures on the guideways that are assigned to the same it is ensured at all times that each discoid cutter comprises a working position on the one guideway as well as on the other guideway. The machining steps can be processed in a time-staggered manner in such a way that in the case of a respective linkage of the beginning of the workpiece transfer and the machining times it is possible to achieve an even higher workpiece throughput.

If more than two discoid cutters are provided, their working positions can be accessed successively by the workpiece fixtures. The substantial adaptability of the apparatus in accordance with the invention to a wide variety of machining tasks and geometrical conditions of the workpieces to be machined is thus ensured at all times in this way.

The apparatus in accordance with the invention is particularly suited for milling occurring parallel to the axis, milling occurring orthogonally and/or cylindrical surface grinding of crankshafts or camshafts for motor construction.

Further preferable embodiments of the invention are given in the dependent claims and will be explained below in closer detail by reference to embodiments shown in the accompanying drawings, in which like reference numerals designate the same elements.

BRIEF DESCRIPTION OF THE DRAWINGS

Coincident components are designated with the same reference numerals in the figures.

DETAILED DESCRIPTION OF THE PREFERRED EMBODIMENT

A workpiece W1 which is to be machined and, in its capacity as a crankshaft, is provided with five main bearing journals a1, a2, a3, a4, a5 and four connecting rod bearing journals b1, b2, b3, b4 and has already been finished at the ends c1, c2 and at the first main bearing journal al. The finish-machining of the main and connecting rod bearing journals a2, a3, a4, a5, b1, b2, b3, b4 takes place in an apparatus in accordance with FIGS. 2 and 3.

Figure 1:
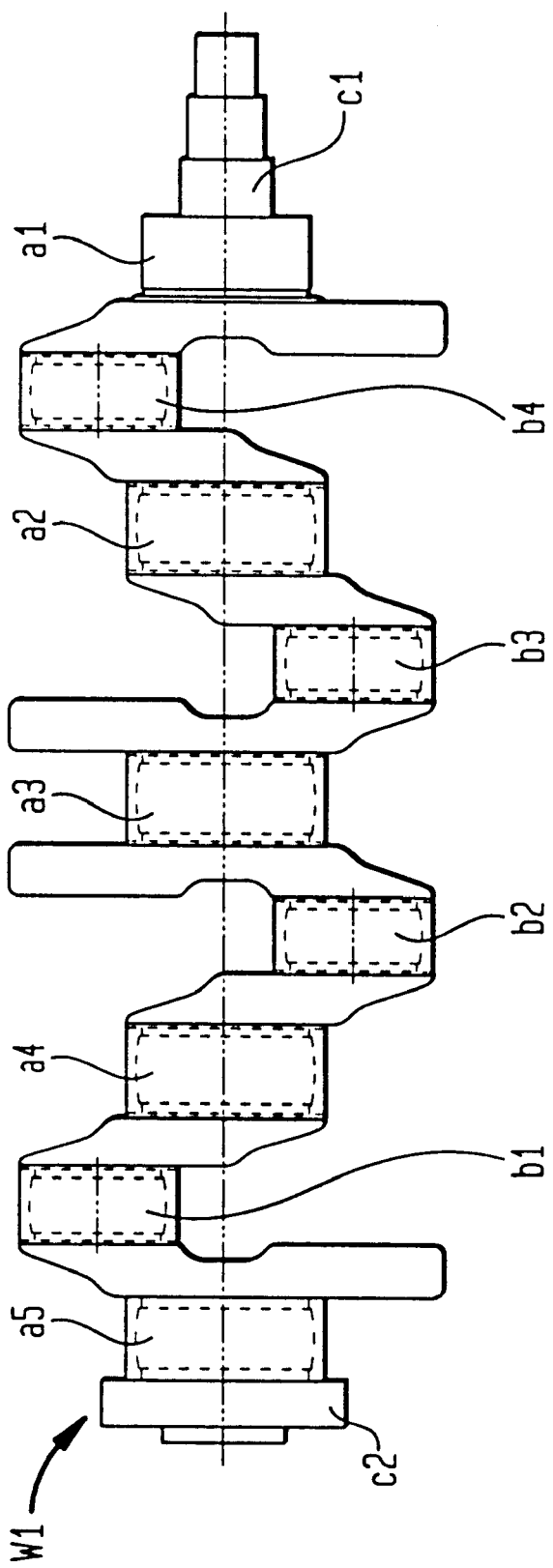
FIG. 1 schematically depicts a workpiece to be machined.
Figure 2:
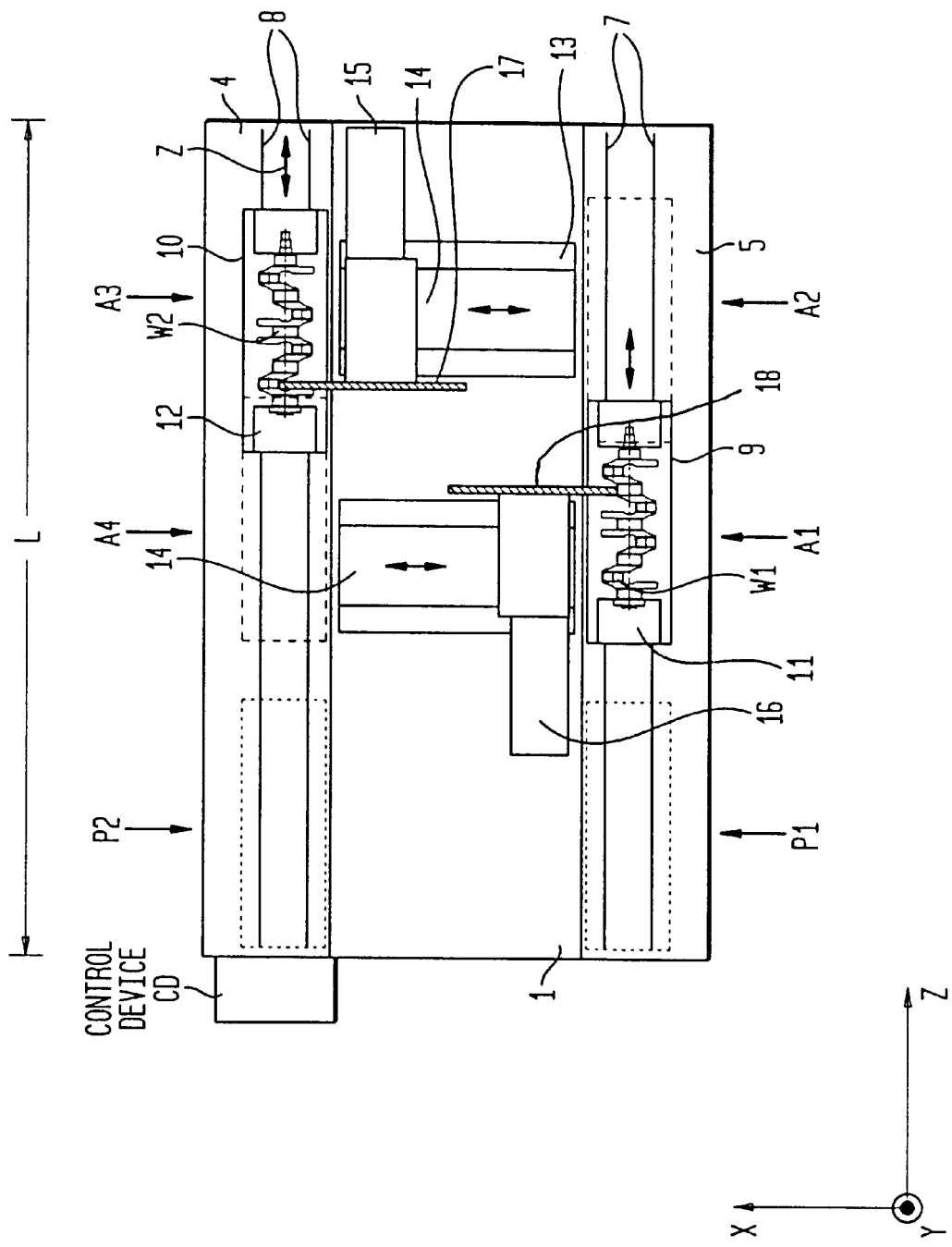
FIG. 2 is a schematic plan view of a first embodiment of an apparatus for milling crankshafts.
Figure 3:
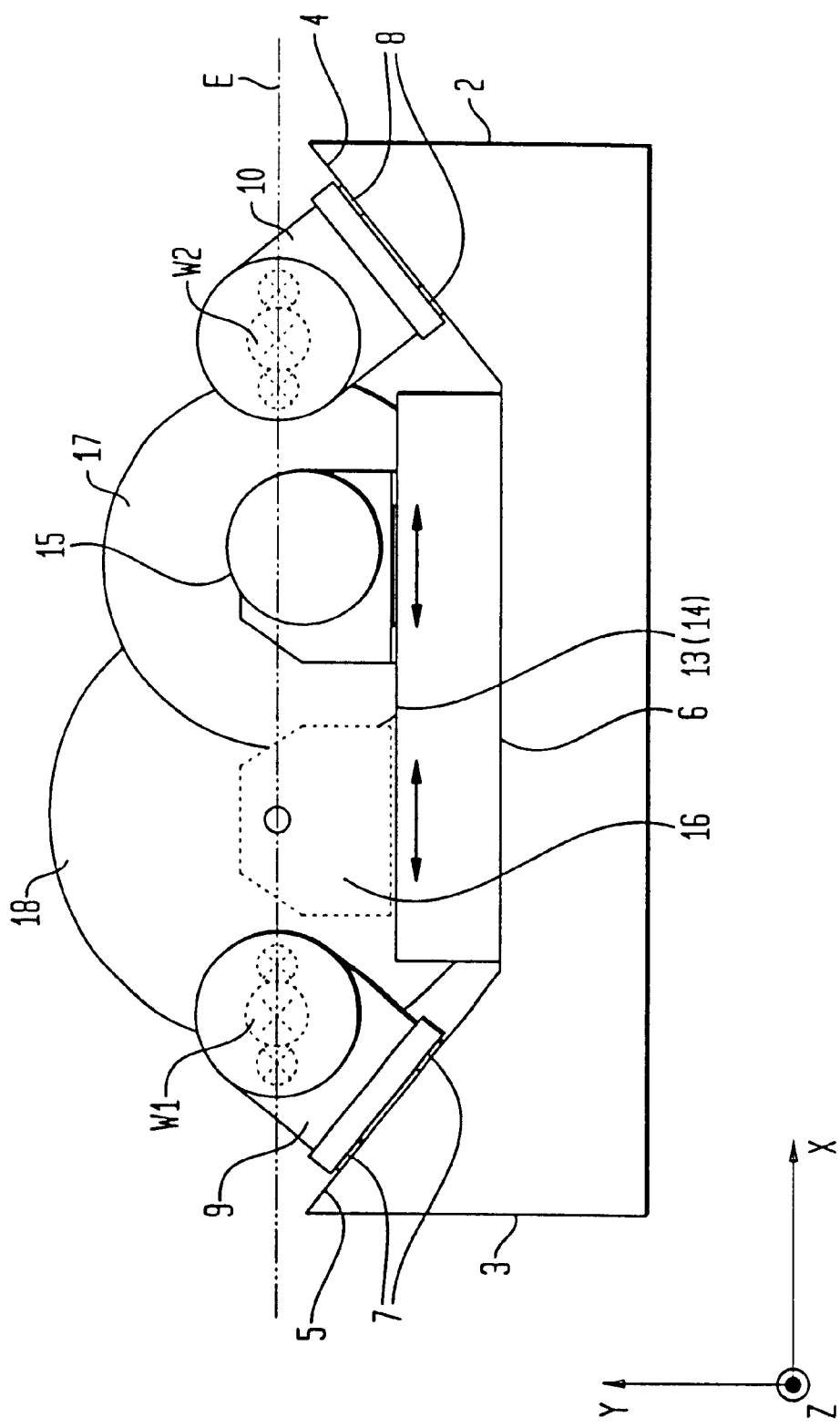
FIG. 3 is a schematic front view of the apparatus in accordance with FIG. 2 on an enlarged scale.
Figure 4:
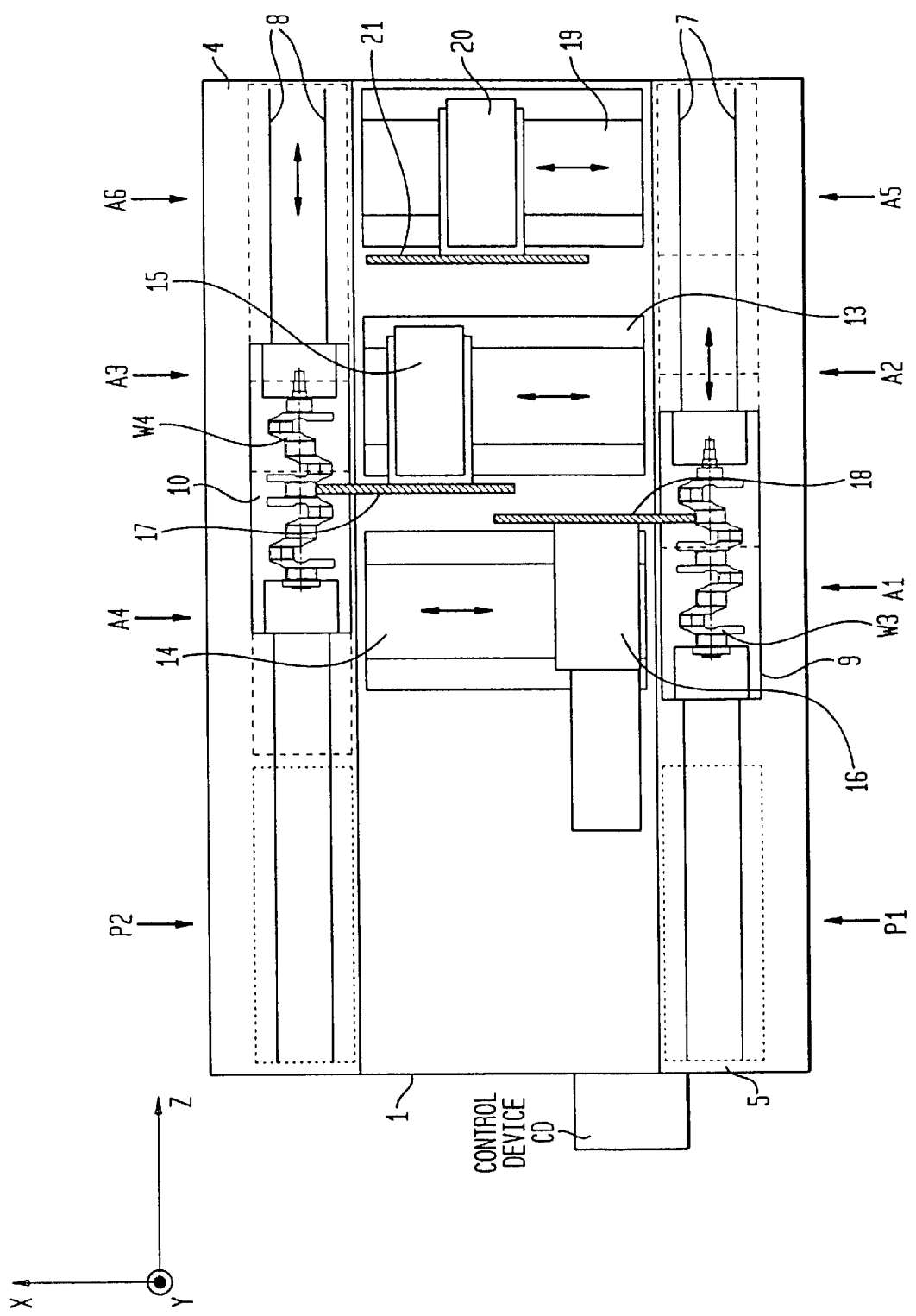
FIG. 4 is a schematic plan view of a second embodiment of an apparatus for milling crankshafts.

The apparatuses as illustrated in FIGS. 2 through 4 are each provided with an engine bed 1. On each of the longitudinal sides 2, 3 of said bed there are arranged a plane inclined surface area 4, 5. The inclined surface areas 4, 5 are inclined towards one another and converge into a horizontally aligned central surface area 6 in the central portion of the engine bed 1 which extends, like the inclined surface areas 4, 5, over the entire length L of the engine bed 1. A linearly extending guideway 7, 8 formed by two rails is arranged on each of the inclined surface areas 4, 5 parallel to the longitudinal sides 2, 3, with the length of the guideway substantially being equivalent to the length L of the engine bed 1. The guideways 7, 9 are used for guiding one workpiece fixture 9, 10.

Each of the workpiece fixtures 9, 10 is movable by actuating devices (not shown herein in closer detail) on the assigned guideway 7 or 8 from a transfer position P1, P2 to at least two working positions A1, A2, A3, A4, A5, A6. In addition, each workpiece fixture 9, 10 is equipped with a clamping chuck in which a workpiece W1, W2, W3, W4 is gripped. The workpieces W1 to W4 can be turned about their longitudinal axis by a turntable drive 11, 12 of the workpiece fixtures 9, 10.

The workpieces W1 to W4 concern the same crankshafts in the examples as explained herein. Similarly, camshafts or other oblong components can also be machined in the described apparatuses.

The apparatuses shown in FIGS. 2 and 4 are equipped with a control device CD which coordinates the motion of rotation of the workpieces W1 to W4 with an advance motion of the cutters 17, 18, 21 during machining.

Every one of the apparatuses as shown in FIGS. 2 to 4 is provided with two rectilinearly arranged cutter guideways 13, 14 on which one cutter unit 15, 16 each is movable by means of actuating drives (not shown). The cutter guideways 13, 14 are aligned orthogonally to the guideways 7, 8, and are mounted on the central surface area 6 of the engine bed 1 and extend substantially over the entire width of said surface area 6. In this way the cutter units 15, 16 and, in combination with them, the discoid cutters 17, 18 which are carried by the same can be advanced on each of the guideways 7, 8. Each cutter 17, 18 is rotatingly driven by way of a drive (not illustrated in detail) of each cutter unit 15, 16, The apparatus as illustrated in FIGS. 2 and 3 comprises two cutter guideways 13, 14 which are arranged in parallel at a distance from one another. The embodiment in accordance with FIG. 4 additionally comprises a third cutter guideway 19 which is arranged on the side of the guideway 13 in a parallel manner and at a distance to the same, which side of guideway 13 is opposite of cutter guideway 14. A third cutter unit 20 with a discoid cutter 21 is held on the cutter guideway 19, which cutter unit is also displaceable by means of an actuating drive (not shown). The mobility of the cutter units 16 and 20 corresponds to the mobility of the cutter unit 15, so that each of the cutter units 15, 16, 20 can reach both a working position A3, A4 and A6 at the guideway 8 as well as a working position A1, A2 and A5 at the guideway 7.

The axes of rotation of the respective cutters 17, 18 and 21 as well as the axes of rotation of the workpieces W1 to W4 which are machined on the respective apparatuses are disposed in a plane E, so that the cutters 17, 18 and 21 can be guided in a positionally correct and simple manner to the sections of the workpiece W1 to W4 which are to be machined and the movements of the respective cutter 17, 18, 21 and the workpiece W1 to W4 can be coordinated in a similarly simple manner during the machining.

In the apparatus in accordance with FIGS. 2 and 3 the workpiece fixture 9 is moved to the transfer position P1 for the purpose of machining the workpiece W1. There, a transfer device (not shown) will transfer the workpiece W1 to be machined which is chucked into the chucking apparatus of workpiece fixture 9.

In the meantime, cutter 17 machines the connecting rod bearing journals of workpiece W2 which is gripped in the workpiece fixture 10. The workpiece W2 is turned about its longitudinal axis by the turntable drive of the workpiece fixture 10. Simultaneously, cutter 17 is moved in an axis of motion X directed normally to the axis of motion Z of the workpiece fixture 10. In this way the movement of the cutter 17 is adjusted in the direction of the axis of motion X to the movement which is performed by the connecting rod bearing journals about the longitudinal axis of the workpiece W2. After finishing the machining of the first connecting rod bearing journal, the workpiece W2 is moved by the workpiece fixture 10 in the direction of the axis of motion Z until the next connecting rod bearing journal of the workpiece W2 to be machined is located in the working zone of the cutter 17. Cutter 17 then commences the machining of the respective connecting rod bearing journal in the manner as described above. In this way all of the connecting rod bearing journals of the workpiece W2 which are to be machined are successively subjected to machining by the cutter 17.

If orthogonal milling is performed during the machining, the actuating drive of the cutter unit 15 will perform the required advance of cutter 17 in the direction of the axis of motion X. For milling parallel to the axis, on the other hand, workpiece W2 is moved by the workpiece fixture 10 in the Z direction during the machining.

Two workpieces W1, W2 are machined simultaneously in the apparatus in accordance with FIGS. 2 and 3. The following machining steps are performed for the workpiece W1:

Loading of the workpiece fixture 9 with the workpiece W1 in the transfer position P1;

alignment and chucking of workpiece W1 on workpiece fixture 9;

displacement of workpiece fixture 9 to the working position A1;

machining of the four main bearing journals a2, a3, a4, a5 of the workpiece W1 by cutter 18, and in this process displacement of the workpiece W1 by the workpiece fixture 9 in the Z direction in order to bring the respective main bearing journals into the working zone of cutter 18;

displacement of workpiece fixture 9 to the working position A2;

machining of the four connecting rod bearing journals b1, b2, b3, b4 of the workpiece WI by cutter 17, and in this process displacement of the workpiece W1 by the workpiece fixture 9 in the Z direction in order bring the respective connecting rod bearing journals into the working zone of the cutter 17;

displacement of the workpiece fixture 9 to the transfer position P1;

Unloading of the finished workpiece W1.

The machining steps are performed as follows for the workpiece W2:

loading of the workpiece fixture 10 with the workpiece W2 in the transfer position P2;

alignment and chucking of workpiece W2 on workpiece fixture 10;

displacement of workpiece fixture 10 to the working position A3;

machining of the four connecting rod bearing journals of the workpiece W2 by cutter 17, and in this process displacement of the workpiece W2 by the workpiece fixture 10 in the Z direction in order to bring the respective connecting rod bearing journals into the working zone of cutter 17;

displacement of workpiece fixture 10 to the working position A4;

machining of the four main bearing journals of the workpiece W2 by cutter 18, and in this process displacement of the workpiece W2 by the workpiece fixture 10 in the Z direction in order bring the respective main bearing journals into the working zone of the cutter 18;

displacement of the workpiece fixture 10 to the transfer position P2;

unloading of the finished workpiece W2.

As a result of the staggered performance of the individual partial operations of the machining, maximum production times of the cutters 17, 18 are achieved. The parallelization of loading and unloading operations, the machining of the main bearing journals by cutter 18 and the machining of the connecting rod bearing journals by cutter 17 lead to the effect that within the cycle time for a workpiece W1 a second workpiece W2 can be completely machined in an offset manner. As a result, machining times with an apparatus as arranged in accordance with the invention are reduced considerably in comparison with the known state of the art.

As in the apparatuses in accordance with FIGS. 2 and 3, two workpieces W3, W4 are machined in the embodiment in accordance with FIG. 4. Additional machining operations are performed by the cutter 21. The respectively machined workpiece W3 and W4 is positioned by the respective workpiece fixture 9, 10 in the respective working zone A5, A6 of cutter 21. Cutter 21 performs the machining of the first main bearing journal a1 if the same has not yet been finished in the introduced workpieces W3, W4.

What is claimed is:

1. An apparatus for machining workpieces by stock removal, comprising:

first and second workpiece guideways which are spaced apart and arranged parallel with respect to one another;

at least first and second workpiece fixtures for holding and rotating at least a first and a second workpiece about respective axes and being movable along respective ones of said workpiece guideways independently of one another from a transfer position to at least one working position;

at least two parallel cutter guideways arranged between said workpiece guideways;

first and second cutters, each being independently reciprocable along a respective one of said cutter guideways from a first working position in which each of said cutters works on said first workpiece held by said first workpiece fixture, to a second working position in which each of said cutters works on said second workpiece held by said second workpiece fixture; and a control device for coordinating the rotation about said axes of said first and second workpieces, respectively, with the reciprocal motion of said first and second cutters.

2. An apparatus according to claim 1, wherein each of the cutter guideways is aligned orthogonally to said workpiece guideways.

3. An apparatus according to claim 1, wherein said workpiece guideways are arranged linearly.

4. An apparatus according to claim 1, wherein each of said workpiece fixtures is movable to various working positions on a corresponding one of said workpiece guideways.

5. An apparatus according to claim 1, wherein each of said workpiece fixtures moves on a respective one of said workpiece guideways during machining.

6. An apparatus according to claim 1, further comprising a third cutter guideway which is aligned parallel to said first and second cutter guideways and on which said third cutter is movable to a third working position in which machining is performed by said third cutter.

7. An apparatus according to claim 1, wherein said workpiece guideways are arranged on planes inclined toward each other.

8. An apparatus according to claim 1, wherein said axes of rotation of said cutters are disposed in a plane and said axis of rotation of said workpieces are disposed in said same plane.

9. An apparatus for machining workpieces by stock removal, comprising:

first and second workpiece guideways which are spaced apart and arranged parallel with respect to one another;

at least first and second workpiece fixtures, for holding and rotating at least a first and a second workpiece with respective axes, and being movable along respective ones of said workpiece guideways from a transfer position to at least one working position;

first and second parallel cutter guideways arranged between said workpiece guideways;

first and second rotating discoid cutters, each having an axis of rotation, each being movable along a respective one of said cutter guideways from a first working position in which each of said discoid cutters works on said first workpiece held by said first workpiece fixture, to a second working position in which each of said discoid cutters works on said second workpiece held by said second workpiece fixture; and a third cutter guideway which is aligned parallel to said first and second cutter guideways and on which a third rotating cutter having an axis of rotation is movable to a third working position in which machining is performed by said third cutter, each of said cutters being dimensioned and disposed in a cutter guideway so that one of said cutters at a time works on a particular one of said workpieces.

* * * * *